Aug. 15, 1939.   A. A. KASARJIAN   2,169,421
SPARK PLUG
Filed Oct. 23, 1936
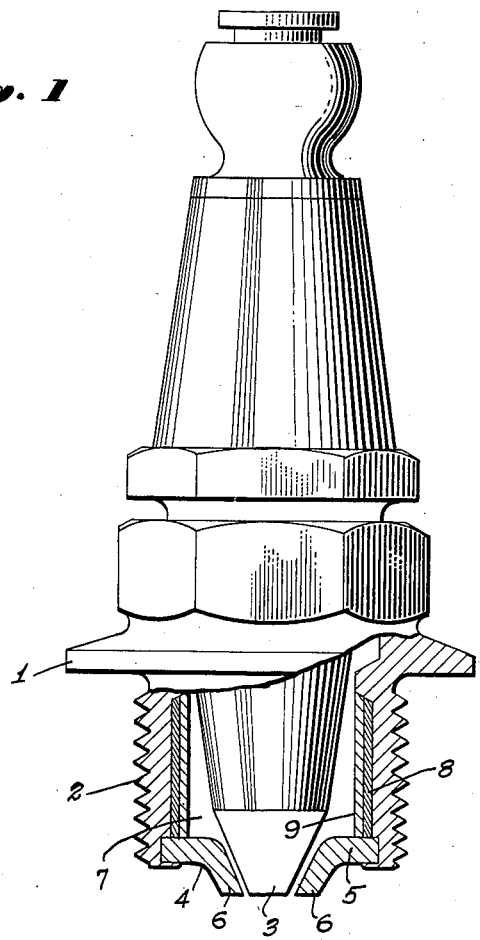
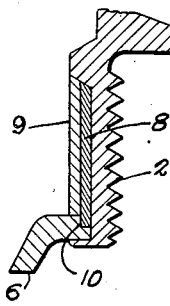
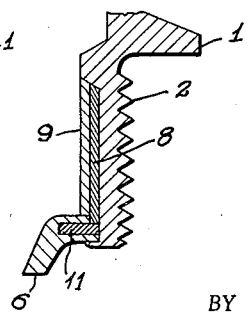
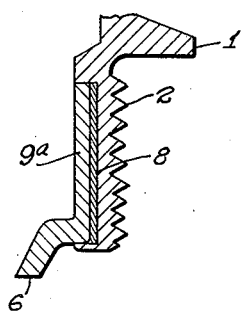
INVENTOR.
Armen A. Kasarjian
ATTORNEY.

Patented Aug. 15, 1939

2,169,421

UNITED STATES PATENT OFFICE 2,169,421

SPARK PLUG

Armen A. Kasarjian, Jackson Heights, Long Island, N. Y., assignor to Mosler Ignition Corporation, New York, N. Y., a corporation of New York Application October 23, 1936, Serial No. 107,117

5 Claims. (Cl. 123—169)

This invention relates to spark plugs and is directed more particularly to the solution of the problem of maintaining proper temperatures in the ground electrode of the plug.

Most automotive engineers entertain the view that pre-ignition is primarily caused through overheating of the center or insulated electrode and that the ground electrode does not materially enter into this problem. I am, however, of the contrary opinion, for it stands to reason that where a ground electrode is made of heat resisting material, and particularly where it is of the baffle type embodying a relatively large mass of metal, the heat resisting material, being a poor conductor, will tend to accumulate heat to a point of incandescence and cause pre-ignition if this heat is not properly dissipated.

It is well recognized, however, that there is an optimum temperature at which the ground electrode should be maintained. If it is appreciably below this temperature, it tends to accumulate carbon, oil and other extraneous matter which causes fouling. Consequently its temperature should be maintained high enough to burn off extraneous matter which tends to accumulate thereon. On the other hand, if it becomes too hot, it may well reach a point where it will cause pre-ignition.

The object of the present invention is to maintain the ground electrode at substantially this optimum temperature where it will neither accumulate extraneous matter or cause pre-ignition.

Speaking generally, the object of the present invention is accomplished by associating with the ground electrode a heat bridge of better conductive material than the ground electrode and so associated with the latter that it has good conductive relation therewith and also with the shell of the plug, so that the heat may readily flow from the ground electrode through this bridge to the shell to preclude the accumulation of excessive heat in the ground electrode. The said heat bridge is, moreover, properly shielded from direct contact with the burning motive fuel constituting the operating charge within the associated cylinder and within the plug chamber, so that it does not take up heat directly from the operating charge, but is rather so shielded that it is free to cooperate with the ground electrode for the purposes stated, without adverse interference.

In practically carrying out the invention any appropriate metal of high conductivity may be employed in the heat bridge, but I preferably utilize copper in this connection, because I have found that, when copper is used, its high specific heat admirably adapts it for the purposes stated. It tends to take up heat from the ground electrode, when the temperature of the latter becomes excessive, and to convey away the undesirable portion of such heat to the shell, whereas, if the temperature of the ground electrode drops below the optimum, the copper tends to give off heat to the ground electrode to raise its temperature to the optimum. In other words, it functions after the manner of a compensating reservoir in which excess heat is stored, to be returned to the ground electrode when the temperature of the latter falls below the optimum. The relation, however, between the heat bridge and the shell is such that undue heat is taken off and conveyed away to the cylinder block, fins or water jackets as the case may be. The heat bridge of copper or the like should be shielded as stated, so as not to be directly influenced by the temperature of the burning charge, whereby it is enabled to cooperate with the ground electrode, in the manner stated, to maintain the latter at the optimum temperature.

Features of the invention, other than those adverted to, will be apparent from the hereinafter detailed description and claims, when read in conjunction with the accompanying drawing.

The accompanying drawing illustrates different practical embodiments of the invention, but the constructions therein shown are to be understood as illustrative, only, and not as defining the limits of the invention.

Figure 1 is a side elevation of a plug showing the shell and ground electrode at the lower end thereof in central section, so that the present invention may be better illustrated.

Figures 2, 3 and 4 are fragmental sections of the lower end of the plug showing modified forms of construction embodying the present invention.

The plug of the present invention may be of conventional type so far as the central electrode, insulating members, bushing nut and shell are concerned, although the shell is modified as hereinafter stated to embody the present invention therein.

As shown in Figure 1, the shell is indicated generally by the reference character 1 and it is provided with a depending exteriorly threaded portion 2 adapted to be screwed into the spark plug hole of the cylinder block in the usual way. The center electrode is shown as provided with a spindle head 3 of a kind well adapted for cooperation with a ground electrode 4 of baffle form. Ground electrodes of this form are well known and widely used. They comprise a circular metal disk 5, mounted in the lower end of the shell and provided with a plurality of prongs 6 arranged in proper cooperative relation with the spindle head 3 and in spaced relation thereto to form, between the prongs and the spindle head, the spark gaps of the plug.

The baffle 4 is generally made of heat resisting material, so as to stand the high temperatures of the explosive charge, particularly when used in high compression engines. The present invention may be associated with other types of plug without departing from the invention, but inasmuch as it is particularly useful in a plug of this kind, it will be described in this connection.

In associating the invention with a plug of the type shown, and after the manner illustrated in Figure 1, I place within the plug chamber 7 two sleeves 8 and 9. The sleeve 8 is of good conducting material, such as silver or copper, or an alloy, the main criterion being that it be a good heat conductor. The sleeve 8 should have good conductive relation with the shell 1, so that heat may readily pass from the sleeve 8 to the shell and said sleeve 8 should also have good conductive relation with the baffle 4, so that heat may pass between these parts without interference. The sleeve 9 is positioned within the sleeve 8, in such manner as to shield the sleeve 8 from direct contact with burning operating charge within the plug chamber 7. The sleeve 9 may be of any appropriate material of a heat resisting character, but should be of a material of considerably lower conductivity than the sleeve 8. I may conveniently make the sleeve 9 of stainless steel, nickel, nickel alloys or even of ceramic material or mica, but, in any event, it should be borne in mind that its purpose is to shield the sleeve 8 from undue direct influence of the combustion charge and consequently it should be a relatively poor conductor.

The sleeves 8 and 9 may be incorporated into the plug construction in various ways. For example, the sleeve 8 may be plated to the shell 2 and the sleeve 9 thereafter inserted as a sleeve or the sleeve may be plated on to the sleeve 9 and thereafter inserted with the sleeve 9 into the shell, or the sleeve 8 may be plated on the interior of the shell and the sleeve 9 thereafter plated over the sleeve 8. Furthermore, both of the sleeves may be introduced, as such, severally or collectively, into the lower end of the shell and the fit may be either a tight, forced fit or a close, sliding fit and, if desired, they may be soldered or brazed to the shell or to each other.

Furthermore, the sleeve 8 in particular should have a good heat conductive relation with the ground electrode baffle. This baffle may simply contact with the sleeve 8 or be secured thereto. For example, the baffle may be provided with a cylindrical portion 9a, as shown in Figure 4, extending well up into the plug chamber with the sleeve 8 contacting therewith and either free from attachment thereto or plated, sweated, brazed, or otherwise secured thereto.

One novel method whereby the sleeve 8 may be incorporated into the structure is to make this sleeve with a fairly close fit and depend upon the greater coefficient of expansion thereof to effect the most efficient heat conductive relation between the parts. For example, if the sleeve 8 is of copper and is interposed between the shell and the sleeve 9 and the baffle, even in a relatively loose condition, the ground electrode will tend to heat rapidly when the engine is started because in such loose condition the copper heat bridge will not carry away the heat in the most efficient way. However, as the parts heat up, this heat will be transferred to the copper which will quickly expand and form very tight contact between the shell and the baffle, thereby establishing an efficient heat bridge without necessitating direct attachment, soldering or brazing between these parts. In other words, the hotter the plug becomes, the better will be the heat bridge and this is the time when the most efficient heat bridge is required. By making the sleeve in the form of a not too tight connection, it will automatically acquire or lose the tight connection, as conditions may require, to give the best results.

The baffle may be secured in the shell by its attachment to the sleeves 8 and 9 or either of them, or it may be soldered or brazed to the shell or it may be secured in place by peening or spinning over the lower end of the shell, as shown in Figure 1, to mechanically lock it in place, or it may be secured in place by any one or more of the stated procedures, but in any event there should be good heat conductive relation between the sleeve 8 and the baffle and the sleeve 8 and the shell. The spun over end of the shell also shields the outer end of the sleeve 8 from contact with the operating charge.

In Figure 2, the structure is similar to that shown in Figure 1, except that the baffle is provided in its outer periphery with a rabbet 10 into which the sleeve 8 extends to produce a more extensive contact between the baffle and the sleeve 8.

In Figure 3, the shell is peripherally channeled to receive a metal 11 of higher conductivity than the baffle. This metal 11 may also be of copper and should be so arranged as to contact with or be brazed or soldered to the sleeve 8. By the construction of Figure 3, the heat bridge is carried closer to the prongs and may even extend into the prongs to more efficiently control the heat of the latter.

In operation, the sleeve 8 acts as a reservoir or conductive link between the baffle and the shell. It takes up heat from the baffle when the temperature of the latter becomes excessive and conveys off the undesirable amount of this heat to the shell with which it has a broad surface contact. If the baffle tends to cool too much, the copper, because of its high specific heat, gives up some of that heat to the baffle, so as to keep the latter from getting so cold as to cause fouling. The heat given off from the baffle to the shell is of course carried off to the cooling fins or water jackets as the case may be. The sleeve 9 shields the sleeve 8 from direct contact with the burning combustion charge and while some heat may be transmitted through the sleeve 9 to the sleeve 8, this will be negligible, as compared to the heat which the sleeve 8 would absorb if not shielded in the manner stated. The best results are obtained when the heat bridge is wholly enclosed, so as not to be directly influenced by direct heat of the explosive charge and in the several forms of the invention which I have disclosed, this is the case in every instance.

There is known to the art plugs wherein the ground electrode baffle is secured to the shell by means of silver solder or the like, interposed in the joint between the baffle and the shell for the primary purpose of keeping this joint tight to permit of the flow of heat from the baffle to the shell. In the absence of such silver solder, there might be a tendency in said prior plugs for the contact between the shell and the baffle to decrease somewhat under changes in temperature in the plug and the silver solder is utilized to overcome the objection which would result from the opening of this joint and to assist in holding the baffle in place in the shell. The present invention should not, however, be confused with this prior art construction for in such construction, the soldering material, whether it be silver solder or the like, is exposed at both ends of the joint to direct contact with the burning operating charge and accordingly this solder takes up the heat directly from the operating charge and is altogether responsive to the disturbing influences thereof, so that it cannot function as a proper heat bridge between the electrode and the shell to transfer heat in an efficient way for it is already loaded up with heat taken directly from the burning charge. In fact, the solder, which may absorb heat more rapidly than the baffle, has a tendency to cause heating of the baffle rather than to effect a cooling thereof to optimum temperature.

The present invention, in contradistinction, provides for effectual shielding of the heat bridge of this invention from the undesirable extraneous influence of the burning charge and it is thus capable of functioning, not only as an efficient heat bridge for the transfer of heat to and fro with respect to the baffle, but is well adapted for the reasons stated, and others, to act as a compensating reservoir adapted to take up the heat from the baffle when the latter becomes too hot and return some of this heat to the baffle when the latter tends to cool off by contact with the incoming charge in the associated engine.

In the preferred embodiment of this invention, as disclosed for example in Figure 1, there is considerably less area of the heat bridge in contact with the baffle than is in contact with the shell. I find this to be the best structure for the heat, which is taken up from the baffle with a relatively small surface contact therewith, is rapidly dissipated through the large surface contact of the heat bridge with the shell, so that there can not possibly be any overheating of the ground electrode. As shown, however, the heat bridge is preferably extended to practically the top of the plug chamber, so as to get the maximum efficiency in dissipation of the heat to the shell and to carry off this heat to a point in the shell directly adjacent the outer cooler wall of the cylinder block.

The foregoing detailed description sets forth the invention in its preferred practical forms, but the invention is not to be understood as limited to these forms, but is rather to be construed as fully commensurate with the appended claims.

Having thus fully described the invention, what I claim as new and desire to secure by Letters Patent is:

1. A spark plug comprising a shell, a ground electrode carried by the shell, a pair of concentric sleeves positioned within the plug chamber in contact with one another and with the outer sleeve in good heat conductive relation with the shell, said outer sleeve being of higher heat conductivity than the inner sleeve or the shell and the outer sleeve being in good heat conductive relation with the electrode, both ends of the outer sleeve being shielded from direct contact with the operating charge.

2. A spark plug comprising a shell, a ground electrode carried by the shell, a pair of concentric sleeves positioned within the shell, the outer sleeve being of higher heat conductivity than the inner sleeve or the shell and being in contact with both of them and with the ground electrode, both ends of the outer sleeve being shielded from direct contact with the operating charge.

3. A spark plug comprising a shell, a ground electrode carried by the shell, a heat bridge of higher heat conductivity than either the shell or the electrode and interposed between them in relatively loose condition when the plug is cold, said heat bridge being of metal having a higher coefficient of expansion than both the shell or electrode and adapted to expand under the influence of heat into tight heat conductive relation to both the electrode and the shell.

4. A spark plug comprising a shell, a ground electrode carried by the shell, a heat bridge of higher heat conductivity than either the shell or the electrode and interposed between them in relatively loose condition when the plug is cold, said heat bridge being of metal having a higher coefficient of expansion than both the shell or electrode and adapted to expand under the influence of heat into tight heat conductive relation to both the electrode and the shell, said heat bridge being shielded from direct contact with the burning operating charge.

5. A spark plug comprising a shell, a ground electrode carried by the shell, and a heat bridge in contact with the ground electrode and with the shell, there being a much greater portion of the heat bridge in contact with the shell than with the electrode, whereby the heat absorbing area is appreciably less than the heat dissipating area of the heat bridge.

ARMEN A. KASARJIAN.